United States Patent
Daga et al.

(10) Patent No.: US 12,511,744 B2
(45) Date of Patent: Dec. 30, 2025

(54) ARTIFACT SEGMENTATION AND/OR UNIFORMITY ASSESSMENT OF A GAMMA CAMERA

(71) Applicant: Siemens Medical Solutions, Malvern, PA (US)

(72) Inventors: Saurav Daga, Bangalore (IN); Sinjoy Saha, Kolkata (DE); Timothy E. Crawford, Roselle, IL (US); Kausar Khan, Bartlett, IL (US); Brian Morris, Maryville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 354 days.

(21) Appl. No.: 18/297,062

(22) Filed: Apr. 7, 2023

(65) Prior Publication Data

US 2024/0338815 A1  Oct. 10, 2024

(51) Int. Cl.
*G06T 7/00* (2017.01)
*G06T 7/11* (2017.01)
*G06T 7/136* (2017.01)

(52) U.S. Cl.
CPC .............. *G06T 7/0012* (2013.01); *G06T 7/11* (2017.01); *G06T 7/136* (2017.01); *G06T 2207/10108* (2013.01); *G06T 2207/20081* (2013.01); *G06T 2207/30168* (2013.01)

(58) Field of Classification Search
CPC ......... G06T 7/0012; G06T 7/11; G06T 7/136; G06T 2207/10108; G06T 2207/20081; G06T 2207/30168; G06T 7/0002; G06T 2207/20084
See application file for complete search history.

(56) References Cited

U.S. PATENT DOCUMENTS

| | | | |
|---|---|---|---|
| 10,896,352 B2 | 1/2021 | Hsieh et al. | |
| 2006/0011847 A1* | 1/2006 | Wang | G01T 1/1648 250/363.09 |
| 2006/0065826 A1* | 3/2006 | Wang | G01T 1/295 250/252.1 |
| 2021/0004965 A1* | 1/2021 | Tung | G06V 10/763 |
| 2021/0117734 A1* | 4/2021 | Popov | G06F 18/24137 |
| 2021/0208289 A1* | 7/2021 | Zhang | G01T 1/1642 |
| 2022/0301224 A1* | 9/2022 | Zhang | G06T 7/75 |
| 2024/0338815 A1* | 10/2024 | Daga | G06T 7/11 |

OTHER PUBLICATIONS

Lofton, Brad K. "New Tools for Monitoring Gamma Camera Uniformity." (2010). 1-184.
Nelson, Jeffrey S., and Ehsan Samei. "Automated quality control in nuclear medicine using the structured noise index." Journal of applied clinical medical physics 21.4 (2020): 80-86.
Nelson, Jeffrey S., et al. "Improved nuclear medicine uniformity assessment with noise texture analysis." Journal of Nuclear Medicine 55.1 (2014): 169-174.

* cited by examiner

*Primary Examiner* — Bobbak Safaipour

(57) ABSTRACT

For assessment of a gamma camera, segmentation of a flood image provides location and size information, providing information for different types of artifacts. A machine-learned model generates an assessment based on input features of the flood image and/or segmentation results. This assessment accounts for size, magnitude, location, and/or type of uniformity.

18 Claims, 5 Drawing Sheets

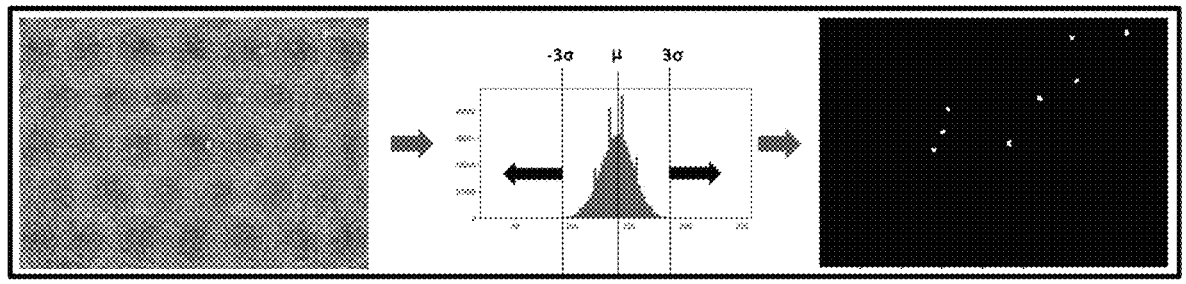
FIG. 7
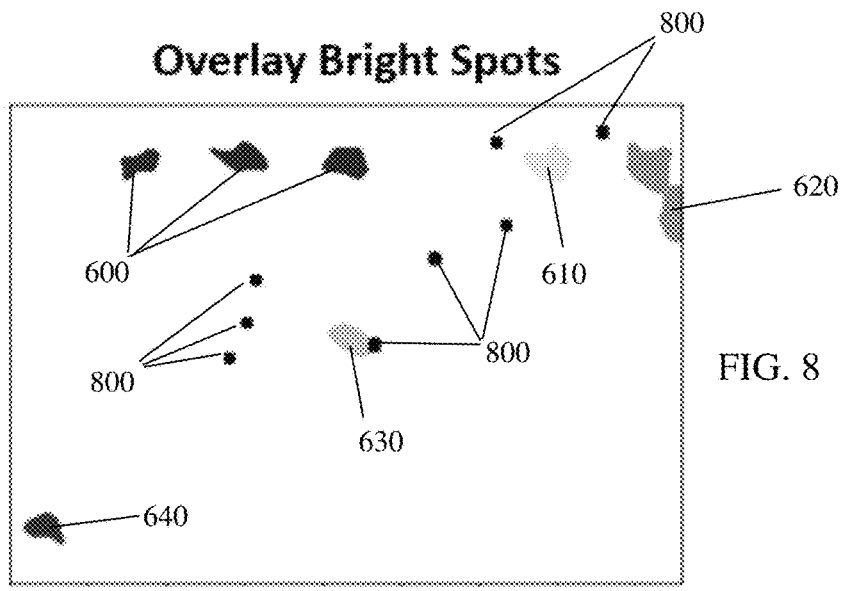
FIG. 8
|  | Uniformity | Model |
|---|---|---|
| F1 - Score | 46.0% | 76.5% |
| Precision | 48.0% | 72.3% |
| Recall | 47.2% | 84.2% |
FIG. 9

ARTIFACT SEGMENTATION AND/OR UNIFORMITY ASSESSMENT OF A GAMMA CAMERA

BACKGROUND

Single Photon Emission Computed Tomography (SPECT) uses a gamma camera to detect emissions from a patient. The ideal gamma camera has a uniform response across the entirety of the camera. In practice, gamma cameras as manufactured or as deteriorating have artifacts reducing the uniformity of response.

Intrinsic Flood Field Uniformity (IFFU) is a routine Quality control for SPECT or gamma cameras. IFFU is performed without a collimator, and the calculations are defined by National Electric Manufacturers Association (NEMA). The calculations provide a uniformity score for comparison against a threshold value usually recommended by the vendor or scanner manufacturer. The score is measured in terms of integral and differential values for useful field of view (UFOV) and central field of view (CFOV).

There are limitations associated with the NEMA scoring standard. IFFU leverages a global measurement value for all types of non-uniformities. The score is dependent on a size and magnitude of non-uniformity in the UFOV and CFOV. Some types of non-uniformity, like crystal hydration, are not captured accurately. The score also does not characterize the spatial location or position of the non-uniformity. Even with the score, there is a need for visual inspection, and visual interpretation is prone to human error and inter-observer variation.

SUMMARY

By way of introduction, the preferred embodiments described below include methods, systems, and non-transitory computer readable media for assessment of a gamma camera. Segmentation of a flood image provides location and size information, providing information for different types of artifacts. A machine-learned (machine-learning) model generates an assessment based on input features of the flood image and/or segmentation results. This assessment accounts for size, magnitude, location, and/or type of uniformity.

In a first aspect, a method of assessment of a gamma camera is provided. The gamma camera acquires a flood image. An image processor segments one or more artifacts in the flood image and determines a uniformity of the gamma camera. The uniformity is determined by a machine-learned model in response to input of features from the flood image to the machine-learned model. A first image representing the uniformity and/or the artifacts as segmented is displayed.

In one embodiment, the segmenting is free of tiling the flood image such that an artifact of an entirety of the flood image is detectable.

In another embodiment, segmenting includes contrast enhancing of the flood image, extracting of frequency as a function of gray scale distribution of the contrast enhanced flood image, and detecting the one or more artifacts with the frequency as a function of the gray scale. As a further approach, detecting includes detecting outliers from the frequency as a function of the gray scale distribution and grouping pixels corresponding to the outliers of the frequency as a function of the gray scale distribution based on proximity. The grouped pixels are the one or more artifacts. The artifacts may, for example, be further detected by clustering the one or more artifacts. In another approach, the outliers are detected based on a first level of standard deviation of the frequency as a function of the gray scale distribution, and intense spots are identified with a second level of standard deviation. The second level is greater than the first level, and the intense spots and the grouped pixels are the one or more artifacts. In yet another approach, a first artifact of the one or more artifacts is detected as a group of pixels corresponding to gray scale outlying from the frequency as a function of the gray scale distribution, and a second artifact of the one or more artifacts is detected as a bright pixel corresponding to gray scale outlying from the frequency as a function of the gray scale distribution.

According to one embodiment, the first image shows the one or more artifacts.

As a further embodiment, the machine-learned model is a random forest model.

In another embodiment, at least one of the features for determining is from the one or more artifacts as segmented. Other features may be used, such as three or more from the group of: mean of the entire flood image, mean of a tile of the flood image, standard deviation of the entire flood image, standard deviation of the tile, skewness of the entire flood image, skewness of the tile, kurtosis of the entire flood image, kurtosis of the tile, coefficient of variance of the entire flood image, and coefficient of variance of the tile. As another example, the features are three or more from the group of: a degree of non-uniformity of the flood image, a difference of Gaussian of the flood image, identification of a spot from the segmented one or more artifacts, identification of a circular pattern in the flood image, identification of a linear pattern in the flood image, a cluster count of the segmented one or more artifacts, and a size of the one or more artifacts.

According to one approach, the output by the machine-learned model is the uniformity as a class for the flood image. The class is output by the machine-learned model as one of five or fewer classes. For example, the five or fewer classes are normal uniformity, borderline uniformity, possible service, and needed service. The first image represents the uniformity as the class output by the machine-learned model.

In a second aspect, a method of assessment of a gamma camera is provided. The gamma camera acquires a flood image. An image processor segments one or more artifacts in the flood image. The segmentation determines location and shape of each of the one or more artifacts in the flood image. A first image is displayed and represents the one or more artifacts as segmented.

In a third aspect, a method of assessment of a gamma camera is provided. The gamma camera acquires a flood image. An image processor determines a uniformity of the gamma camera. The uniformity is determined by a machine-learned model in response to input of features from the flood image to the machine-learned model. A first image represents the uniformity.

In one embodiment, the different ones of the features correspond to different types of artifacts. The uniformity is determined as a class for the flood image. The class is output by the machine-learned model as one of five or fewer classes corresponding to different levels of the uniformity.

Features, embodiments, or aspects of one type of claim (e.g., method or system) may be used in another type of claim (e.g., system or method). Various embodiments or approaches of the first aspect may be provided for the second and/or third aspects. Systems and non-transitory computer readable storage media may be provided for any of the aspects and corresponding approaches or embodiments. The image processor of a system is configured to perform the acts of the method. The instructions of the non-transitory computer readable storage media are for performing the acts of the method.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 7 illustrates an example of identification of bright spots;

FIG. 8 illustrates an example combination of the clustered groups of outliers of FIG. 6 and the bright spots of FIG. 7 as the segmented artifacts;

FIG. 9 is a table showing improved performance for uniformity measurement by a machine-learned model as compared to the NEMA standard.

DETAILED DESCRIPTION

Figure 1:
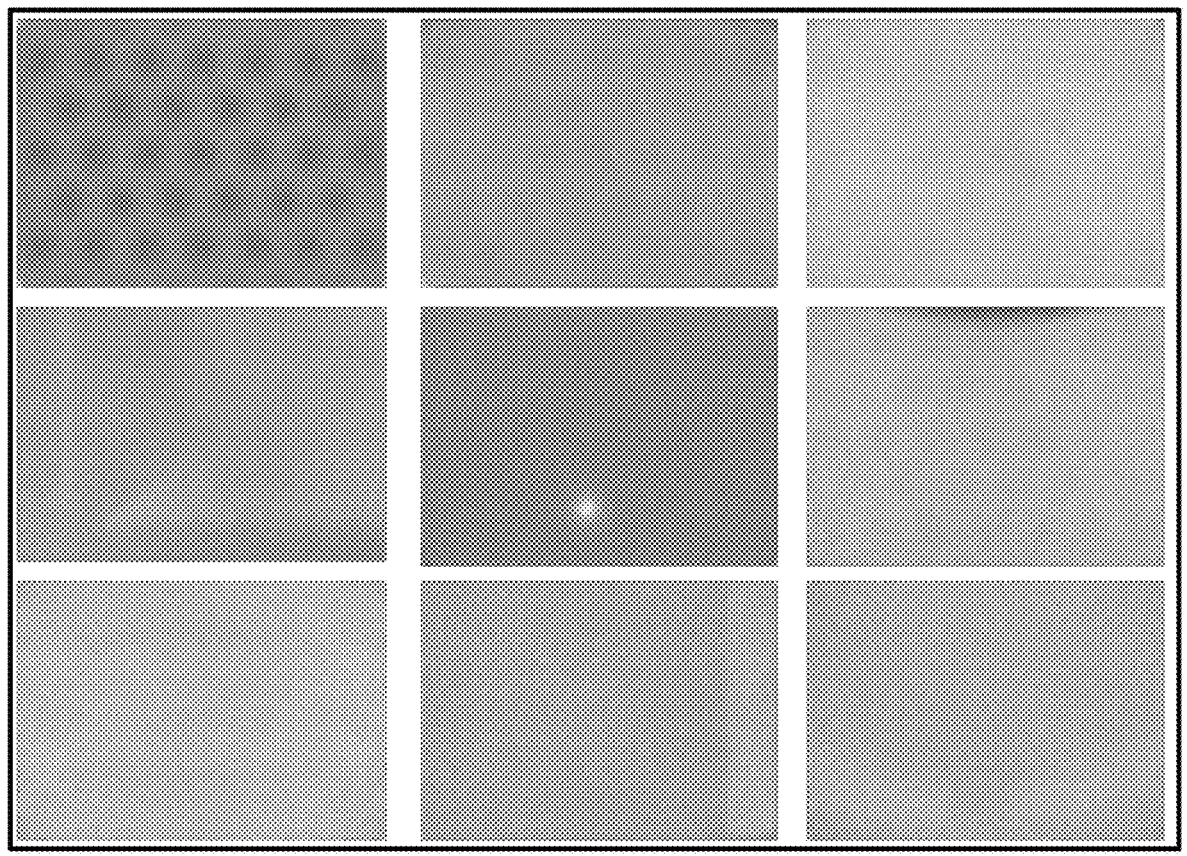
FIG. 1 shows example types of artifacts in flood images for gamma cameras.

Automated quality control of SPECT scanners (e.g., gamma cameras) is created. The quality control accounts for non-uniformities within the gamma camera excluding a collimator. The different types of non-uniformity found in flood images vary from common artifacts like tubeyness, crystal hydration, PMT failure, etc. to multiple other patterns. FIG. 1 shows nine examples of different artifacts for a gamma camera. The proposed approach may deal with and/or identify these different types of artifacts. The proposed approach may allow for daily, weekly, monthly, or another frequency of flood-field uniformity evaluations on intrinsic calibrated flood images with 200 M or another count.

In one approach, an artifact segmentation model segments irrespective of shape, size and/or location. Multiple types of non-uniformity are automatically detected. Artifacts are segmented using a model which does not rely on regions of interest (ROIs). As an example, the segmentation includes artifact enhancement, Gaussian outlier detection, grouping outliers in proximity, clustering of artifacts, and overlay of intense spots, if any. Segmentation allows for easier visual interpretation of non-uniformity. The segmentation provides a visual explanation of artifacts irrespective of size, shape and location.

Additionally, or alternatively, the uniformity assessment uses machine learning with multiple parameters for varied non-uniformities. Instead of a single score, various types of non-uniformities are accounted for by application of multiple metrics to a machine learning model for classification of appropriate service action. Accurate service action based on a reliable assessment score is directly provided. A classifier provides uniformity quality control by outputting by category for service. An intrinsic approach is used, but an extrinsic approach may be used.

Figure 2:
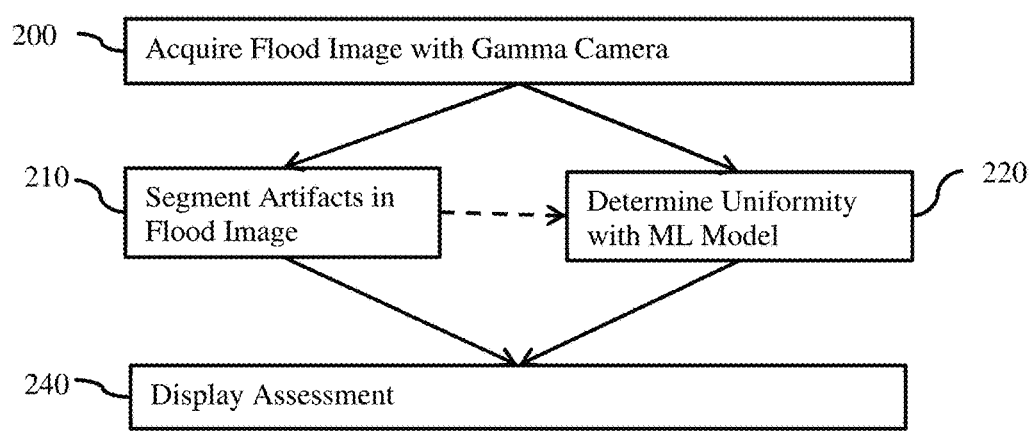
FIG. 2 is a flow chart diagram of one embodiment of a method for assessment of a gamma camera.

FIG. 2 is a flow chart diagram of one embodiment of a method of assessment of a gamma camera. The assessment includes processor segmentation of different types of artifacts and/or determination of uniformity by a machine-learned model.

Figure 10:
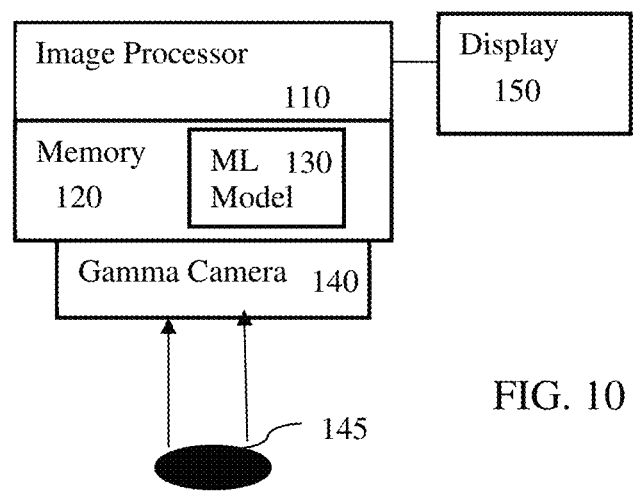
FIG. 10 is a block diagram of one embodiment of a system for assessment of a gamma camera.

The acts are performed by the system of FIG. 10 or a different system. For example, a server, workstation, computer, or another image processor receives a flood image acquired by the gamma camera (e.g., acquired by the SPECT system or imager), segments, and/or determines uniformity. The image processor generates an image, which a display device displays. Other devices may perform any of the acts.

Additional, different, or fewer acts may be performed. For example, act 210 or act 220 is not provided. As another example, acts for responding to uniformity determination, segmentation output, or other assessment are provided, such as replacing or repairing the gamma camera. In yet another example, acts related to training the machine-learned model used for uniformity determination are provided.

The acts are performed in the order shown (i.e., top to bottom or numerical) or a different order. For example, acts 210 is performed prior to act 220, but may be performed after or simultaneously (e.g., interleaved) with act 220.

In act 200, the gamma camera acquires a flood image. For example, a source of emissions is placed at one or more locations in front of the gamma camera. A collimator is not used. The gamma camera detects emissions. Any duration and/or corresponding count may be used, such as a 200 M count. An intrinsic calibration image is acquired. The image from the gamma camera responsive to the emissions should be uniform. Flaws, degradation, or other problems in the gamma camera, such as problems with the solid-state, sodium iodide (NaI), or another scintillation-based (photomultiplier tube) detector forming the gamma camera and/or detector electronics integrated in or connected with the gamma camera, result in non-uniformity. FIG. 1 shows examples of non-uniformity resulting in artifacts in flood images.

In response to incident radiation interacting with the detector, a signal over time or pulse is generated for different pixels or locations. The detector or simulation generates signal (e.g., voltage, current, pulse, or scintillation) as a function of time and/or as a count in response to each instance of incident radiation. The sensors are arranged along a rectangular or other grid to provide a two-dimensional planar array for detecting gamma radiation. The flood image represents detection of the radiation over the planar array.

In act 210, an image processor segments one or more artifacts in the flood image. The segmentation determines a location, size, and/or shape of each of the artifacts in the flood image. By finding a boundary or area, the size and shape are determined. By positioning this boundary or area in the image, the location of the artifact is determined.

Each of the artifacts in the image is segmented. Different types of artifacts may be segmented. The same or different process is used to segment the different types of artifacts.

The artifacts as segmented may be labeled by type or may be identified as artifacts without classification to the type of artifact.

Any process for segmentation may be used. For example, pattern matching with rotation, translation, and/or scaling is used. As another example, thresholding is applied. Region growing and/or shrinking may be used. In yet another example, a machine-learned model detects the artifacts, such as locating the boundary and/or area of artifacts in response to input of the flood image to the machine-learned model.

The segmentation is free of tiling the flood image. As a result, artifacts that would otherwise extend over or into two or more tiles are located. By not tiling in the segmentation, an artifact of an entirety of the flood image is detectable. Using regions of interest for small portions of the full image results in scale limitations on the detectable artifacts. The choice of ROI size limits the size of the artifact structure to be smaller than the size of ROI. Some artifacts may be larger. Where the segmentation does not divide (e.g., ROIs or tiles) the flood image, larger artifacts may be more reliably detected. In other embodiments, tiling or sub-division into ROIs may be used in the segmentation for artifacts.

In one embodiment, an unsupervised approach segments the artifact of any shape, size, and/or location in a flood image. Clustering may be used to refine the artifact determination. A sequence is provided as an artifact segmentation model. The sequence includes artifact enhancement (e.g., contrast enhancement), Gaussian outlier detection, and grouping outliers in proximity as segmented artifacts with or without clustering groups as segmented artifacts. Other processes may be included to locate other artifacts, such as detection of intense spots, if any. The resulting artifacts are combined or overlayed, providing segmentation of different types of artifacts identified by any of the segmentation approaches.

The image processor enhances the artifacts in the flood image. The enhancement may be by brightening or another image process. In one approach, the image processor contrast enhances the flood image. Any contrast enhancement technique may be used such as intensity value mapping, Histogram Equalization (HE), Adaptive Histogram Equalization (AHE), etc. For example, Contrast Limited Adaptive Histogram Equalization (CLAHE) followed by Gaussian Blur noise reduction technique is used. The Gaussian Blur is applied after (and not before) CLAHE to prevent removal of non-uniformities prior to enhancement. Other high frequency filtering than Gaussian Blur may be used.

Figure 3:
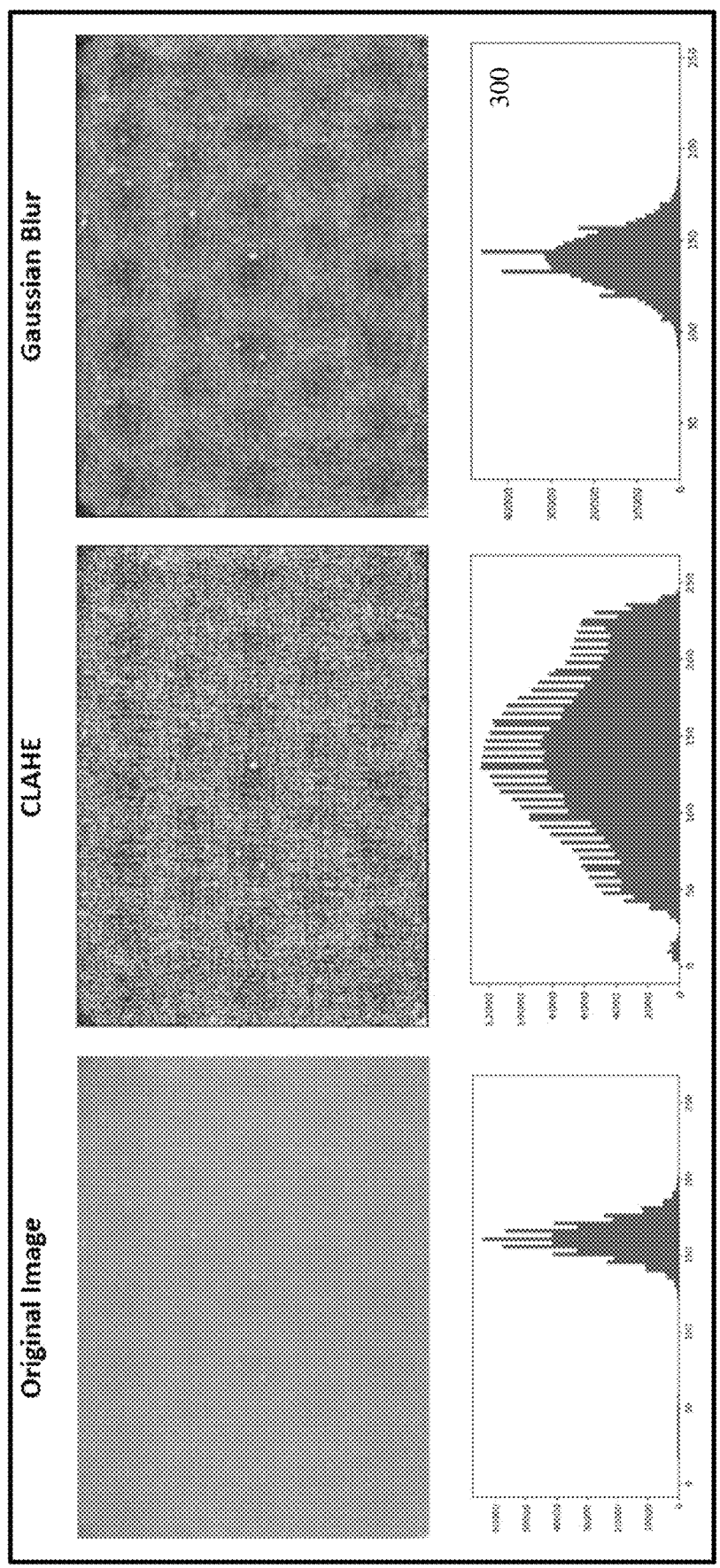
FIG. 3 illustrates an example contrast enhancement and corresponding gray scale distribution.

FIG. 3 shows an example. The original image is a flood image. The distribution below the flood image represents a histogram or frequency of different gray scale levels in the flood image. This frequency as a function of gray scale distribution of the flood image is shown for comparison and may not be calculated. The middle image labeled CLAHE is the flood image resulting from the contrast enhancement. The distribution below the CLAHE image shows the resulting distribution from CLAHE. Compared to the distribution of the original image, CLAHE broadens the distribution over a greater range and adds high frequency variation to the distribution. The Gaussian Blur reduces the distribution and high frequency variation introduced by CLAHE.

The distribution after CLAHE or Gaussian Blur is calculated and used to locate artifacts. One or more artifacts are detected with the frequency as a function of the gray scale distribution. Outliers of the distribution represent artifacts. The outliers are gray scale levels. Each gray scale level corresponds to pixels of the flood image. These pixels are detected by applying a threshold to the distribution. For example, the outliers are detected by calculating the mean and standard deviation of the pixel intensity distribution obtained after artifact enhancement. If a pixel value is a certain number of deviations away from mean, then the pixel is identified as an outlier. A typical threshold value for number of standard deviations in this scenario is 1.5, such as 1.5, 1.4, or 1.6. Other thresholds may be used, such as 1.0 or 2.0.

Figure 4:
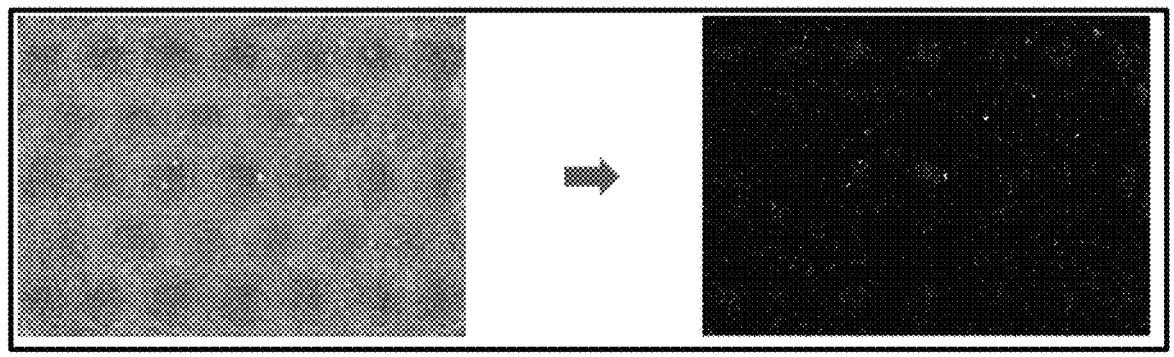
FIG. 4 illustrates an example detection of outliers.

FIG. 4 illustrates an example. The flood image after Gaussian Blur is shown on the left. After thresholding based on 1.5 sigma, the pixels corresponding to outliers are shown in white on the right, and the normal or within 1.5 sigma pixels are shown in black on the right.

The white pixels correspond to artifacts. Different thresholds may be applied to find different artifacts. For example, the image processor detects one artifact as a group of pixels corresponding to gray scale outlying from the frequency as a function of the gray scale distribution by one threshold (e.g., 1.5 to 2 sigma) and another artifact as a bright pixel corresponding to gray scale outlying from the frequency as a function of the gray scale distribution by another threshold (e.g., greater than 2 sigma). Other thresholding may be used.

Since the artifacts may be more than single pixels, the artifacts are detected by grouping pixels corresponding to the outliers. The outliers detected from the previous step are typically of two types—structured and unstructured. The structured outliers are densely located, while the unstructured set of outliers are sparsely located. Structured outliers are of particular interest. The grouping is based on proximity for the structured outliers. Each group of outliers is an artifact. In one embodiment, multiple iterations of morphological operations, like erosion and dilation, are used for grouping (e.g., for cleaning to resolve outlying pixels into a group as an artifact). Unstructured outliers are removed, and structured outliers are grouped as blobs.

Figure 5:
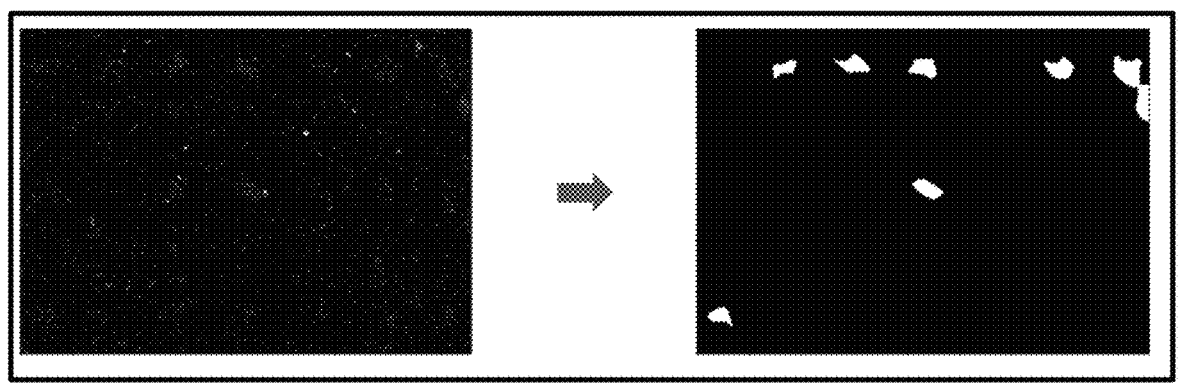
FIG. 5 illustrates an example of grouping outliers.

FIG. 5 shows an example. The outliers (e.g., right image of FIG. 4 now shown as the left image of FIG. 5) are grouped, resulting in artifacts of different shapes and sizes in the right image of FIG. 5. Some outliers are removed.

The artifacts may be related. Two or more artifacts may be linked as one artifact. In one embodiment, the image processor clusters artifacts from structured outliers, resulting a larger artifact formed from multiple artifacts or blobs. The blobs may be multiple small segments of single pattern. Moreover, there may be any number of artifacts present in a flood image. Clustering finds artifacts that are formed from multiple blogs. In one embodiment, Density Based Spatial Clustering of Application with Noise (DBSCAN) is used to identify clusters of artifacts and differentiate non-uniform patterns from one another. Other clustering may be used.

Figure 6:
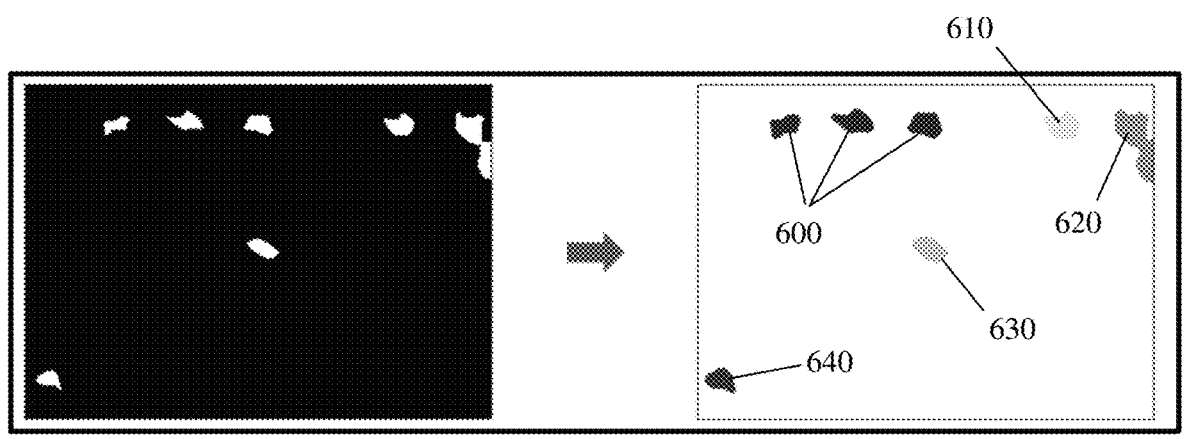
FIG. 6 illustrates an example of clustering groups of outliers.

FIG. 6 shows an example. The blobs as artifacts found by grouping are shown on the left side (e.g., left side of FIG. 6 is the right side of FIG. 5). The clustering identifies four artifacts. Artifact 600 is formed from three separate blogs. Artifact 620 is formed from two touching or connected blobs. Artifacts 610, 630, and 640 are individual blobs.

In the process of morphological operations, certain pixels with very high or very low intensity (outliers from the distribution) are removed. These pixels also signify the presence of artifacts. For example, crystal hydration is visible as a bright white spot. Crystal hydration is an important artifact that should be segmented during quality control. The image processor identifies these intense spots with another threshold or level of gray scale applied to the distribution. This threshold level is greater than the one used to identify pixels for structured artifacts. For example, instead of using +/−1.5 sigma, six sigma (i.e., pixels further away than 3 sigma (+/−3 sigma)) towards each tail of the Gaussian distribution calculated from the Gaussian Blur flood image is used. If a group of dark or bright spots are clearly visible, the image processor segments them based on having gray scale 3 sigma or more from the mean. While referred to as bright spots, the spots may be outliers for being dark.

FIG. 7 shows an example. The left image is the Gaussian Blurred flood image. Outliers from the distribution of the Gaussian Blurred flood image are identified as 3 sigma, $3\sigma$, or more from the mean, $\mu$. The result are pixels or groups of pixels, as represented in the right image of FIG. 7 as white spots. These white spots are segmented artifacts, such as crystal hydration artifacts. The white spots may be from positive and/or negative standard deviation.

Other processes for segmenting specific types of artifacts may be used. One process, such as the enhancement and detection by grouping or clustering, may identify different types of artifacts. Another process may identify artifacts of only one type. Any number of processes may be used, such as just the enhancement and detection by grouping or clustering and the bright spot identification.

FIG. 8 shows the combination of different artifacts. The bright spots (3 sigma higher and/or lower than mean) and structured artifacts (grouped pixels) 600, 610, 620, 630, 640 from clustering are combined. The artifacts, with shape, size, and location, are overlaid with each other, indicating the various segmented artifacts in the flood image. If any bright or dark spots are found, these artifacts are overlayed on the clustered or grouped pixel image. Because of the inherent design of the artifact segmentation model, the artifacts of any shape are captured with the positional information.

Referring again to FIG. 2, the image processor determines the uniformity in act 220. Information from the segmentation, such as size, position, and/or shape of artifacts (see dashed line), may be used for determining uniformity. Alternatively, or additionally, features from the flood image are used to determine uniformity. The uniformity of the gamma camera is determined from one or more features.

The intrinsic uniformity calculated as per NEMA guidelines is used for uniformity assessment. The differential and integral values for UFOV and CFOV are used to assess uniformity in the NEMA score. The measured values should meet the specification provided by the vendor or manufacturer. If the value does not meet the specification, there is a need for visual inspection and corresponding service action. Also, the urgency and type of service action needed is highly dependent on the type of non-uniformity like crystal hydration, PMT Defect, tubeyness, etc. It is usually very difficult to capture multiple types of uniformity using a single metric as attempted by the NEMA standard. A single metric usually captures the magnitude and not the type of non-uniformity.

In act 220, the uniformity is determined by a machine-learned model. The image processor applies a machine-learned model, inputting values for features to the model where the model, in response, outputs the service level or other indication of uniformity. The uniformity is informed by and/or considers the type of artifact to determine the classification (level of uniformity) output.

The machine-learned model is a random forest model. Other decision tree models may be machine trained to output uniformity in response to input of features. In other embodiments, a support vector machine, neural network (e.g., convolutional neural network or fully connected neural network), generative adversarial network, DenseNet, or another machine learning model may be trained and used as a machine-learned model.

For training, many samples of the input parameters and the ground truth output are gathered. Expert annotation, NEMA scores with expert confirmation, simulation, and/or other approaches may be used for the ground truth. The training data may include many flood images from different gamma cameras and corresponding levels of uniformity. The model machine learns to output correct uniformity in response to input of the samples (e.g., features extracted from segmentation and/or flood image and/or the flood image).

The model or network includes learnable parameters, the values of which are determined in machine training to output the uniformity. The machine training determines the values of the learnable parameters (e.g., weights, connections, filter kernels, pooling, . . . ) that estimate the uniformity given the inputs. In training, the similarity of the estimated uniformity to the ground truth is minimized. The difference between the estimated uniformity and the known or ground truth uniformity provides a loss. The loss is minimized. Any loss such as Gini impurity or entropy may be used for decision-tree models. Any optimization may be used, such as Adam, RMSprop optimizer, or SGD. The machine-learning model may be further optimized by studying the loss in cross-validation sets and fine-tuning the hyperparameters like number of estimators, maximum depth or maximum features in random forest model, and number of layers, filter kernels or its size and others for neural networks-based models.

The machine (e.g., processor) trains the model using the training data and optimization. The result is a machine-learned model. New or previously unseen combinations of input values may be applied to the machine-learned model, which outputs the uniformity for the new or previously unseen combination of input values based on the learned values of the learnable parameters. Once trained, a matrix, kernels (e.g., learned convolution weights), architecture and values of learned parameters, and/or other representation of a machine-learned model is output and stored for use in previously unseen cases. The machine-learned model is output to a computer network or memory. For example, the random forest model as trained is stored in a memory for transfer and/or later application. Once the model is trained, the model may be applied.

Various features for input may be used. In one embodiment, the flood image and/or the segmentation image or results are input as the features. Alternatively, or additionally, features are derived from the flood image and/or segmentation image or results, and those values are input. Multiple parameters or features may be used. For example, three or more (e.g., tens or hundreds) of features are used. The multiple metrics are extracted as features from the flood image and/or segmentation.

Different features may be indicative of different types of artifacts. Multiple features (metrics or parameters) that can account for varying non-uniformities are used.

In one embodiment, the features are for UFOV and CFOV. The same or different parameters may be used for UFOV and CFOV. For example, three or more of mean of the entire flood image, mean of a tile of the flood image, standard deviation of the entire flood image, standard deviation of the tile, skewness of the entire flood image, skewness of the tile, kurtosis of the entire flood image, kurtosis of the tile, coefficient of variance of the entire flood image, and coefficient of variance of the tile are used. Additional, different, or fewer statistical measures of the flood image may be used. The tile may be CFOV or tiles in other positions.

In another embodiment, the features are three or more from the group of: a degree of non-uniformity of the flood image, a difference of Gaussian of the flood image, identification of a spot from the segmented one or more artifacts, identification of a circular pattern in the flood image, identification of a linear pattern in the flood image, a cluster count of the segmented one or more artifacts, and a size of the one or more artifacts. Additional, different, or fewer measures from the segmentation and/or the flood image may be used.

In yet another embodiment, statistical measures and other measures from the segmentation and/or the flood image are used. One example group of features, values of which are input to the machine-learned model, is provided as: (a) mean, standard deviation, skewness, kurtosis, and coefficient of variance of UFOV, CFOV, and/or tiles of the flood image (basic measures and may show effect of outlier or extreme pixels), (b) degree of non-uniformity of the flood image (e.g., number of counts to make uniform to indicate recursive blurring), (c) difference of Gaussian of the flood image (greater difference shows higher non-uniformity), (d) spots identified from segmentation (e.g., position, size, shape, and/or magnitude showing hydration), (e) identification of circular patterns from the flood image (e.g., Hough transform to show tubeyness or black blotches), (f) identification of linear pattern in the flood image (e.g., horizontal, vertical, and/or other angles of lines are found such as based on gradient threshold), (g) NEMA score from the flood image (e.g., integral and differential UFOV and CFOV), (h) cluster count of the segmented artifacts, and/or (i) size of segmented artifacts. Additional, different, or fewer features may be used.

The machine-learned model, as applied by the image processor, outputs uniformity in response to input of values of the features. The uniformity is an assessment of the gamma camera. The uniformity is expressed as a service level, state, or other characterization of the quality of the gamma camera. The uniformity is determined as a class for the flood image and corresponding gamma camera.

The machine-learned model outputs the uniformity as a constant value over a range or as one of a given number of possible classes. For example, the uniformity is one of five or fewer classes. In one embodiment, four classes are provided. Based on the evaluation by the machine-learned model, the outcome is classified as one of the four categories of uniformity assessment in terms of service action or other levels of uniformity. For example, the four classes of service action indicating uniformity are: normal uniformity (the analysis of the intrinsic calibration image indicates a normal appearance), borderline uniformity (the analysis of the intrinsic calibration image indicates a borderline appearance), possible service (the analysis of the intrinsic calibration image indicates that service may be required), and needed service (the analysis of the intrinsic calibration image indicates that service is required). The type of service action and urgency is dependent on the type of non-uniformity like hydration, tubeyness, etc. Use of the machine-learned model allows for consideration of the type through the use of different features in order to generate an output that is more informative than the NEMA standard approach. Multiple metrics or parameters (features) may account for varying non-uniformities.

FIG. 9 shows a difference in performance for uniformity determined from the NEMA standard and by the machine-learned model implemented as a random forest. The F1 score, Precision, and Recall metrics all show substantial (almost twice as good) performance improvement for the machine-learned model as compared to the uniformity from the NEMA standard.

In act 240, the image processor generates an image. The image is displayed on a display screen or device for use by service personnel or others.

The image represents the uniformity and/or artifacts as segmented. For example, an image of the segmented artifacts is displayed (e.g., see FIG. 8). The segmentation may be displayed instead as the flood image with graphics, annotations, and/or overlays of the segmented artifacts. Different artifacts (e.g., clusters) may be identified with different color and/or labels or are not separately identified from other artifacts. Alternatively, or additionally, the size, shape, and/or location of the artifacts are displayed as a graph or table.

In another example, the uniformity is displayed. The image shows textual, graphical, color, or other indication of the uniformity. For example, text and a corresponding color are displayed for the service level (e.g., green for normal, yellow for borderline, pink for service may be required, and red for service needed). The class or value within the range is represented in the image. The uniformity is displayed alone or with the flood image.

The image may include a combination of information. For example, the uniformity is provided as an annotation on or next to a flood image with the segmentation overlaid on or displayed next to the flood image. Where types of artifacts are identified, annotation (text) or graphic labels may be used to indicate the type of artifact.

FIG. 10 shows a system for assessment of a gamma camera 140. The system includes the gamma camera 140 for detection of incident radiation from a calibration source 145. The system includes an image processor 110, a memory 120, and a display 150. The image processor 110, memory 120, and/or display 150 are part of a medical imaging system or are separate (e.g., a computer or workstation communicatively connected to a gamma camera 140 of a medical imaging system or separate from a medical imaging system). Additional, different, or fewer components may be provided. For example, the system is a computer without the gamma camera 140. As another example, user input, patient bed, or other SPECT related devices are provided. Other parts of the system may include power supplies, communications systems, and user interface systems.

The gamma camera 140 is a solid-state detector or semiconductor material, such as CdZnTe, CdTe, HPGe, or TlBr. Alternatively, the gamma camera 140 is a NaI or other material-based scintillator and/or photomultiplier tube detector. The gamma camera 140 is configured by design to generate a signal in response to receipt of incident radiation. When the radiation interacts with the gamma camera 140, signal or count is formed.

For SPECT, the gamma camera 140 may connect with a gantry. The gamma camera 140 is a planar photon detector. The gantry rotates the gamma camera 140 about the patient. During scanning of a patient, emission events are detected with the camera 140 at different positions or angles relative to the patient. Alternatively, or additionally, a patient bed moves the patient relative to the gamma camera 140 and collimator. In other embodiments, the gamma camera 140 is not installed in an imaging system, such as being assessed at the point of manufacture of the gamma camera 140 or the SPECT system.

The image processor 110 is a general processor, artificial intelligence processor or accelerator, digital signal processor, graphics processing unit, application specific integrated circuit, field programmable gate array, digital circuit, analog circuit, combinations thereof, or other now known or later developed device for calibration or assessment from a flood image, applying a machine-learned model, segmenting, and/or generating an image based on uniformity and/or segmentation. The image processor 110 is a single device, a plurality of devices, or a network. For more than one device, parallel or sequential division of processing may be used. Different devices making up the image processor 110 may perform different functions, such as one processor (e.g., general or microprocessor) for segmenting and another processor (e.g., graphics processing unit or field programmable gate array) for determining uniformity with a machine-learned model 130. In one embodiment, the image processor 110 is a control processor or other processor of the medical imaging system. In other embodiments, the image processor 110 is part of a separate workstation or computer.

The image processor 110 operates pursuant to stored instructions to perform various acts described herein, such as acts 210, 220, and 240 of the method of FIG. 2. The image processor 110 is configured by software, firmware, and/or hardware to perform the acts.

The display 150 is a CRT, LCD, plasma screen, projector, printer, or other output device for showing an image. The display 150 displays an image of the segmentation and/or uniformity. The image may include the flood image acquired by the gamma camera 140.

The flood image, segmented artifacts, machine-learned model 130, uniformity output, information derived during processing (e.g., various segmentation stages), and/or other information are stored in the memory 120. The memory 120 may store data at different stages of processing. The data is stored in any format.

The memory 120 is a buffer, cache, RAM, removable media, hard drive, magnetic, optical, database, or other now known or later developed memory. The memory 120 is a single device or group of two or more devices. The memory 120 is part of the medical imaging system or a remote workstation or database, such as a PACS memory.

The memory 120 is additionally or alternatively a non-transitory computer readable storage medium with processing instructions. The memory 120 stores data representing instructions executable by the programmed image processor 110. The instructions for implementing the processes, methods, and/or techniques discussed herein are provided on non-transitory computer-readable storage media or memories, such as a cache, buffer, RAM, removable media, hard drive, or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method of assessment of a gamma camera, the method comprising:
    acquiring, by the gamma camera, a flood image;
    segmenting, by an image processor, one or more artifacts in the flood image;
    determining, by the image processor, a uniformity of the gamma camera, the uniformity determined by a machine-learned model in response to input of features from the flood image to the machine-learned model, at least one of the features being from the one or more artifacts as segmented; and
    displaying a first image representing the uniformity and/or the artifacts as segmented.

2. The method of claim 1 wherein segmenting comprises segmenting free of tiling the flood image such that an artifact of an entirety of the flood image is detectable.

3. A method of assessment of a gamma camera, the method comprising:
    acquiring, by the gamma camera, a flood image;
    segmenting, by an image processor, one or more artifacts in the flood image;
    determining, by the image processor, a uniformity of the gamma camera, the uniformity determined by a machine-learned model in response to input of features from the flood image to the machine-learned model; and
    displaying a first image representing the uniformity and/or the artifacts as segmented;
    wherein segmenting comprises contrast enhancing of the flood image, extracting of frequency as a function of gray scale distribution of the contrast enhanced flood image, and detecting the one or more artifacts with the frequency as a function of the gray scale.

4. The method of claim 3 wherein detecting comprises detecting outliers from the frequency as a function of the gray scale distribution, and grouping pixels corresponding to the outliers of the frequency as a function of the gray scale distribution based on proximity, the grouped pixels comprising the one or more artifacts.

5. The method of claim 4 further comprising clustering the one or more artifacts.

6. The method of claim 4 wherein detecting the outliers comprises detecting based on a first level of standard deviation of the frequency as a function of the gray scale distribution, and further comprising identifying intense spots with a second level of standard deviation, the second level being greater than the first level, the intense spots and the grouped pixels comprising the one or more artifacts.

7. The method of claim 3 wherein detecting comprises detecting a first artifact of the one or more artifacts as a group of pixels corresponding to gray scale outlying from the frequency as a function of the gray scale distribution and a second artifact of the one or more artifacts as a bright pixel corresponding to gray scale outlying from the frequency as a function of the gray scale distribution.

8. The method of claim 1 wherein displaying comprises displaying the first image as the one or more artifacts.

9. The method of claim 1 wherein determining comprises determining by the machine-learned model, the machine-learned model comprising a random forest model.

10. A method of assessment of a gamma camera, the method comprising:
acquiring, by the gamma camera, a flood image;
segmenting, by an image processor, one or more artifacts in the flood image;
determining, by the image processor, a uniformity of the gamma camera, the uniformity determined by a machine-learned model in response to input of features from the flood image to the machine-learned model; and
displaying a first image representing the uniformity and/or the artifacts as segmented;
wherein determining comprises determining where the features comprise three or more from the group of: mean of the entire flood image, mean of a tile of the flood image, standard deviation of the entire flood image, standard deviation of the tile, skewness of the entire flood image, skewness of the tile, kurtosis of the entire flood image, kurtosis of the tile, coefficient of variance of the entire flood image, and coefficient of variance of the tile.

11. The method of claim 1 wherein determining comprises determining where the features comprise three or more from the group of: a degree of non-uniformity of the flood image, a difference of Gaussian of the flood image, identification of a spot from the segmented one or more artifacts, identification of a circular pattern in the flood image, identification of a linear pattern in the flood image, a cluster count of the segmented one or more artifacts, and a size of the one or more artifacts.

12. The method of claim 1 wherein determining comprises determining the uniformity as a class for the flood image, the class output by the machine-learned model as one of five or fewer classes.

13. The method of claim 12 wherein the five or fewer classes comprise normal uniformity, borderline uniformity, possible service, and needed service, and wherein displaying comprises displaying the first image as representing the uniformity as the class output by the machine-learned model.

14. A method of assessment of a gamma camera, the method comprising:
acquiring, by the gamma camera, a flood image;
segmenting, by an image processor, one or more artifacts in the flood image, the segmenting determining location and shape of each of the one or more artifacts in the flood image, wherein segmenting comprises contrast enhancing of the flood image, extracting of frequency as a function of gray scale distribution of the contrast enhanced flood image, and detecting the one or more artifacts with the frequency as a function of the gray scale distribution;
displaying a first image representing the one or more artifacts as segmented.

15. The method of claim 14 wherein detecting comprises detecting outliers from the frequency as a function of the gray scale distribution, and grouping pixels corresponding to the outliers of the frequency as a function of the gray scale distribution based on proximity, the grouped pixels comprising the one or more artifacts.

16. The method of claim 14 wherein detecting comprises detecting a first artifact of the one or more artifacts as a group of pixels corresponding to gray scale outlying from the frequency as a function of the gray scale distribution and a second artifact of the one or more artifacts as a bright pixel corresponding to gray scale outlying from the frequency as a function of the gray scale distribution.

17. A method of assessment of a gamma camera, the method comprising:
acquiring, by the gamma camera, a flood image;
determining, by an image processor, a uniformity of the gamma camera, the uniformity determined by a machine-learned model in response to input of features from the flood image to the machine-learned model, wherein the uniformity is determined as a class for the flood image output by the machine-learned model, the class output by the machine-learned model being one of five or fewer classes corresponding to different levels of the uniformity; and
displaying a first image representing the uniformity.

18. The method of claim 17 wherein different ones of the features correspond to different types of artifacts.

* * * * *